Feb. 7, 1939.  W. S. JENNENS ET AL  2,146,073
ELECTRICAL MEASURING APPARATUS
Filed Jan. 22, 1937

INVENTORS
WALTER S. JENNENS
BY CHARLES J. MILLER JR.
ATTORNEY

Patented Feb. 7, 1939

2,146,073

UNITED STATES PATENT OFFICE 2,146,073

ELECTRICAL MEASURING APPARATUS

Walter S. Jennens and Charles J. Miller, Jr., Barberton, Ohio, assignors to The Ohio Brass Company, Mansfield, Ohio, a corporation of New Jersey Application January 22, 1937, Serial No. 121,901

1 Claim. (Cl. 175—183)

This invention relates to electrical measuring apparatus and particularly to apparatus for measuring electrical quantities which affect the natural period of oscillation of an electrical circuit such as inductance and capacitance.

One object of the invention is to provide simple and accurate apparatus for measuring electrical susceptance by comparison of oscillation frequencies.

A further object of the invention is to provide measuring apparatus which does not require a high degree of technical skill for operation, and in which the readings may be made visually.

A further object of the invention is to provide electrical measuring apparatus in which the observations may be made by means of a tuning indication tube.

A further object of the invention is to provide a measuring circuit in which the frequency of oscillation of one circuit is influenced by the test piece, and in which said frequency of oscillation is compared to a reference circuit of known frequency.

A further object of the invention is to provide testing apparatus which is economical to manufacture, which is easily portable and by which accurate measurement may be made without a high degree of technical skill.

A further object of the invention is to provide measuring apparatus which shall be of improved construction and operation.

Other objects and advantages will appear from the following description.

The invention is exemplified by the combination and arrangement of parts shown in the accompanying drawing and described in the following specification, and it is more particularly pointed out in the appended claim.

Figure 1:
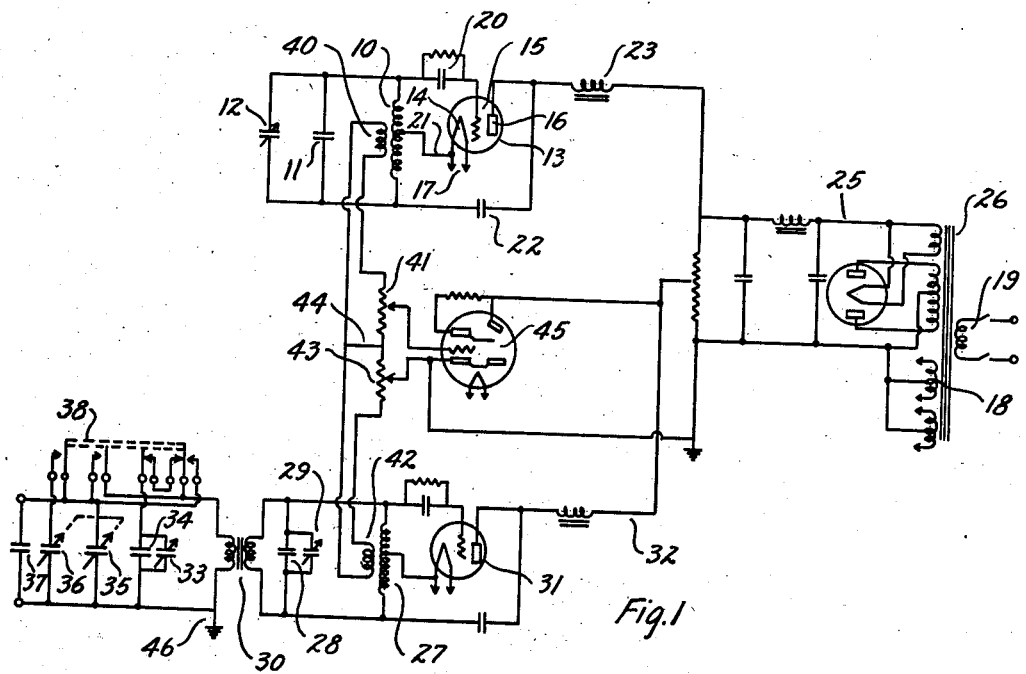
Fig. 1 is a circuit diagram showing one embodiment of the invention.

The measuring apparatus as illustrated in the drawing comprises a reference oscillator, a test oscillator, of which the unknown capacitance is a part of the oscillating circuit, and means for visually observing when the test oscillator is tuned to exactly the same frequency as the reference oscillator.

The reference oscillator is shown in the upper portion of Fig. 1 of the diagram and comprises an oscillatory circuit including inductance 10 and capacitance 11. An adjustable capacitance 12 is connected in parallel with the capacitance 11 to provide for slight adjustment of the reference frequency. Oscillation of the reference circuit is maintained by means of a vacuum tube 13 having a filament 14, a grid 15, and a plate 16. The filament 14 is connected through its terminals 17 to any source of heating current such as the secondary 18 of a transformer, the primary 19 of which is energized from an ordinary 110-volt A. C. lighting circuit. The grid 15 is connected by means of a grid leak and condenser 20 with one terminal of the inductance 10 and one terminal of the filament 14 is connected by a lead 21 to an intermediate point on the inductance 10.

The plate 16 is connected through a capacitance 22 to the end of inductance 10 opposite that connected to the grid. The plate 16 is also connected through a choke coil 23 to a direct current source of voltage which may be supplied by a well known form of rectifier circuit 25 with the requisite secondary windings on the core 26 of the transformer of which 19 is the primary.

The reference oscillator may be any one of many different kinds that have definite periods of oscillation. The one illustrated in the diagram employs the well known standard Hartley circuit. The arrangement and operation of this circuit is more fully described in any standard radio handbook. The frequency of oscillation of the circuit is determined by the inductance 10 and capacitance units 11 and 12. A circuit oscillating at a thousand cycles per second has been found to be well adapted for the purpose of this invention.

The test oscillator shown in the lower part of the figure may be any type of vacuum tube oscillator in which the reactance may control the frequency of oscillation. The one shown in the diagram comprises a standard Hartley circuit in which the frequency of oscillation is determined by inductance 27, capacitance units 28 and 29, and other capacitance units connected to the circuit through a transformer 30, the operation of which will be more fully described.

Oscillation of the test oscillator is maintained by a vacuum tube 31 similar to the tube 13 and connected through lead 32 to the rectifier 25.

Capacitors 33, 34, 35, 36, and 37 may be connected in certain combinations by means of a switch 38 to the secondary of the transformer 30. The capacitors 33 and 34 are high grade standard devices and are adjusted to a fixed known value by means of the variable unit 33 and when once so adjusted are sealed against further adjustment, so that they constitute a fixed capacitance of known value. 37 is the test piece, the capacitance of which is to be measured. 35 and 36 are adjustable capacitors, controlled by a single operating wheel provided with graduated scales, which are calibrated to indicate the capacitance of the test piece.

A pick up coil or secondary 40 is associated with the inductance 10 and is connected in circuit with a potentiometer 41. A second pick up coil 42 is associated with the inductance 27 and is connected in circuit with a potentiometer 43. The ends of the potentiometers 41 and 43 are connected together at 44. Means are provided for observing when the reference circuit and test circuit are oscillating at the same frequency by comparing the potential of intermediate points on the two potentiometers 41 and 43. One form of indicator well suited for this purpose is a tuning indicator tube 45 commonly designated in the trade by the designation No. 6E5, and sometimes referred to as an electric eye. The tube is commonly used in radio receiving circuits for indication of optimum tuning of receiving sets to the various frequencies of different broadcasting stations. The tube consists essentially of a triode unit and an electron ray device. It is so designed that a zero voltage between the grid and cathode of the triode unit produces a dark sector on the target of the cathode ray portion of the tube, and as a negative potential is applied, the black sector closes up to a narrow line. If alternating current is applied, the sector will close on the negative half cycle and remain open on the positive. The grid and cathode of the tube are connected respectively to the potentiometers 41 and 42 at the proper positions to give equal voltage. When the frequencies of oscillation of the two oscillators are identical and they are 180 degrees out of phase, the voltage between the grid and cathode of the tube 45 is zero and the black sector on the target remains wide open. This gives a very sensitive indication since the slightest difference in frequency will not give a stationary wide open sector. If the frequencies are slightly different, the black sector on the target will open and close at a frequency which is the difference between two oscillation frequencies. It is very easy, therefore, for even an unskilled observer to determine when the two oscillators are tuned to the same frequency.

In operation, the apparatus is connected up as shown in Fig. 1 with the switch 38 in the position indicated. In this position the capacitor 33—34 is connected to the secondary of the transformer 30 and the capacitors 35, 36, and 37 are disconnected. The variable capacitor 12 may now be adjusted if required to give the reference oscillator the same frequency as the test oscillator. The switch may now be shifted to the right, which will disconnect the standard capacitor 33—34 and substitute therefor the capacitor 35 in parallel with the test piece 37. The capacitor 35 is then adjusted until the test circuit is again brought to the same frequency as the reference circuit, which of course, is the same frequency it had with the standard capacitor 33—34 in the circuit. When this adjustment is obtained, the capacitance of the test piece may be ascertained from the reading of the scale on the adjustable capacitance 35, since the capacitance of the test piece, plus that of the capacitor 35 as adjusted, is equal to that of the standard capacitor 33—34. In practice, the scale on the unit 35 may be graduated to read the value of the capacitance of the test piece directly, or the capacitance of the test piece may be obtained by referring the scale readings to a calibration curve.

In order to extend the range of the instrument, a second adjustable capacitor 36 is provided, which may be connected in parallel with the capacitor 35 by shifting the switch 38 to the left instead of the right. The two capacitors 35 and 36 are preferably operated by the same handle or hand wheel which may be provided with two scales, one for use when the switch handle is moved to the right, and the other for use when the switch handle is moved to the left. The effect of the capacitors in the circuit controlled by the switch 38 is multiplied by the transformer 30, the effect being proportional to the square of the transformer ratio. It is usually desirable to ground one terminal of the test piece as indicated at 46. The transformer 30 makes it possible to do this without placing a ground on the test oscillator circuit, which would short circuit a portion of the inductance 27.

Figure 2:
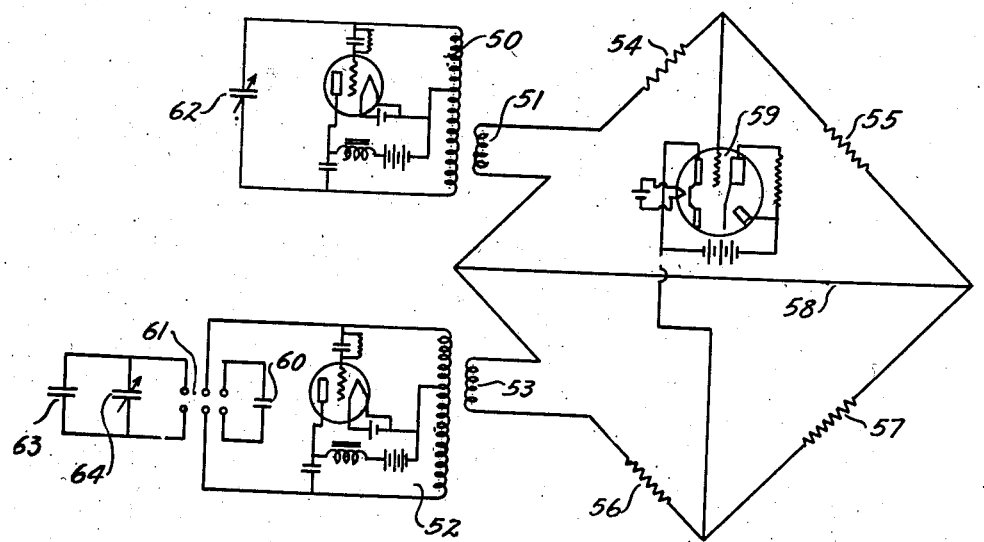
Fig. 2 is a somewhat simplified diagram of the invention.

In the diagram shown in Fig. 2 the circuit is represented in the form of a bridge having the reference oscillator 50 connected in one leg of the bridge through a pick up coil 51 and the test oscillator 52 is connected in another leg of the bridge through a pick up coil 53. Impedances 54 and 55 correspond to the parts of the impedance 41 in Fig. 1 of the drawing, and impedances 56 and 57 correspond to the parts of the impedance 43 in Fig. 1 of the drawing. The conductor 58 forms the common point of connection between the circuits energized by the pick up coils 51 and 53 respectively. In practice, the conductor 58 need not be employed, but the points shown in the drawing at the two ends of this conductor are connected to a common point. The indicator 59 connects intermediate points of the potentiometers formed by the impedances 54 and 55 and the impedances 56 and 57. In place of a rectifier, the energy for the various tubes and for the oscillators may be supplied from batteries as shown in this figure.

In operation, a standard capacitor 60 is connected in the circuit by the switch 61 and a capacitor 62 is adjusted to bring the reference oscillator into synchronism with the test oscillator. The switch 61 is then moved to substitute the test piece 63 and the adjustable capacitor 64 for the standard capacitor 60. The capacitor 64 is then adjusted to restore the frequency of the oscillator 52 to its original value as compared with the reference oscillator 50. The capacitance of the test piece 63 may then be determined from the scale reading of the variable capacitor 64 in the manner discussed in connection with Fig. 1.

Various modifications of the invention will readily suggest themselves to those skilled in the art, and we do not wish therefore to be restricted to the particular forms shown and described, except as set forth in the following claim.

We claim:

Measuring apparatus comprising a test oscillator having a circuit energized thereby, a standard reactance for connection in said circuit to impart a predetermined frequency of oscillation thereto, means for connecting an unknown reactance and an adjustable reactance in parallel with each other in said circuit in lieu of said standard reactance, a reference oscillator circuit having an adjustable reactance therein, and means for comparing the frequency of said test oscillator circuit and said reference oscillator circuit to facilitate adjusting said reference circuit to said standard frequency and the determination of said unknown reactance by the substitution method, said means comprising two closed circuits energized by said test oscillator and said reference oscillator respectively, said closed circuits being joined at a common point, an electron ray tuning indicator tube having its grid and cathode connected respectively each to a point in one of said circuits, and impedance in series in said circuits respectively between said common point and the respective points of connection with said grid and cathode.

WALTER S. JENNENS.
CHARLES J. MILLER, Jr.